Patented Aug. 4, 1942

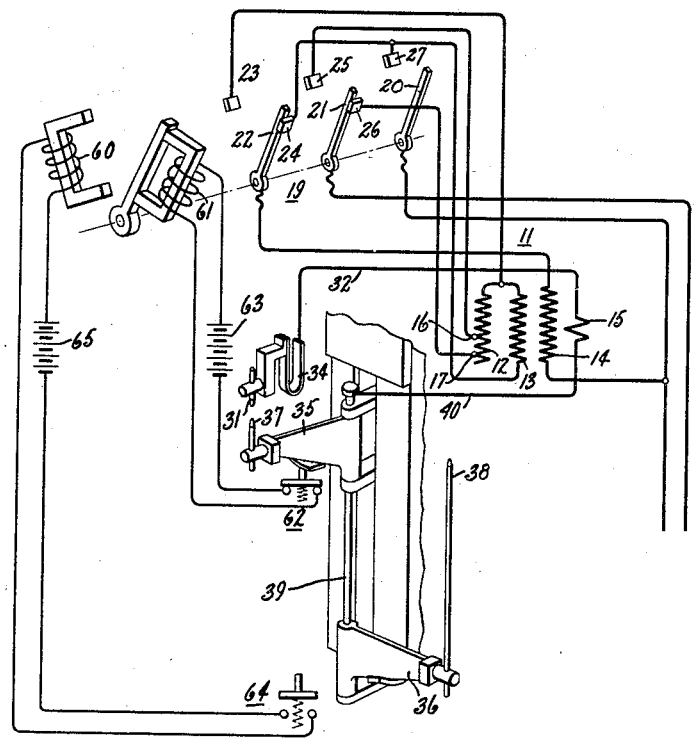

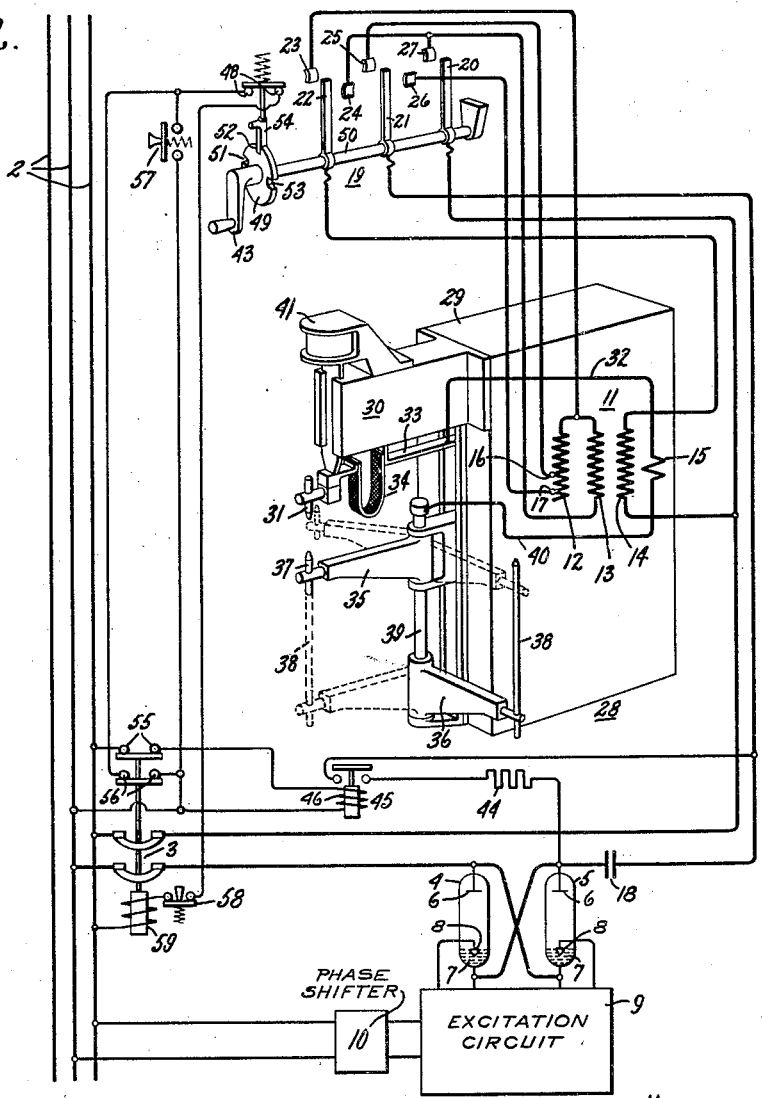

2,292,135

UNITED STATES PATENT OFFICE 2,292,135

ELECTRIC TRANSLATING SYSTEM

Louis G. Levoy, Jr., Schenectady, N. Y., assignor to General Electric Company, a corporation of New York Application June 27, 1941, Serial No. 400,019

19 Claims. (Cl. 219—4)

My invention relates to electric translating systems, and more particularly to electric valve translating systems for energizing a load circuit from an alternating current supply circuit.

In the application of translating apparatus to systems where it is desired to energize a load circuit, such as a welding circuit, from an alternating current supply circuit, it is of increasing importance to provide equipment which does not impose low power factor conditions on the supply circuit. This requirement is of particular importance in those applications where the load circuit is energized intermittently or periodically. In accordance with the teachings of my invention described hereinafter, I provide a new and improved electric translating system whereby a load circuit may be energized from an alternating current supply circuit, and wherein the power factor of the load imposed on the supply circuit is maintained substantially at unity.

The instant invention is an improvement of my invention disclosed and claimed in a copending patent application Serial No. 290,602, filed August 17, 1939, which matured into United States Letters Patent No. 2,256,209 on September 16, 1941, entitled "Electric translating circuits," and which is assigned to the assignee of the present application.

It is an object of my invention to provide a new and improved electric translating system.

It is another object of my invention to provide a new and improved electric valve translating system.

It is a further object of my invention to provide a new and improved electric translating circuit for energizing a load circuit from an alternating current supply circuit, and wherein means are provided for controlling the translating apparatus to maintain the power factor of the load imposed on the supply circuit at unity irrespective of variations in the impedance of the load circuit.

Briefly stated, in the illustrated embodiment of my invention I provide an improved electric translating system for energizing a load circuit, such as a welding circuit, from an associated alternating current supply circuit. Some welding circuits which are employed to energize welding machines, having variable throat adjustments, cause a substantial variation in the impedance of the load circuit. As disclosed and claimed in my above-identified application I employ means, such as a capacitance, for correcting the power factor of the load imposed on the supply circuit. This means may comprise a capacitance which is connected in series relation with the primary winding of a power transformer and circuit controlling means, such as electric valve apparatus. When the load circuit is subjected to considerable impedance variation, it is of practical importance to maintain the circuit in substantial resonance with respect to the frequency of the supply voltage in order that the power factor of the load imposed on the supply circuit remain at a relatively high value. For practical purposes, it is of extreme importance to compensate or adjust the translating apparatus in order to maintain the circuit in substantial resonance irrespective of variations in the load impedance. In accordance with the teachings of my invention, described hereinafter, I provide means for controlling the translating apparatus by the exclusive variation of the turn ratio of the power transformer whereby the equivalent or reflected impedance of the power transformer and load, as viewed from the primary side, is maintained at a value corresponding to the capacitive reactance of the capacitance in order that the circuit be maintained in a resonant condition.

For a better understanding of my invention, reference may be had to the following description taken in connection with the accompanying drawings and its scope will be pointed out in the appended claims. Fig. 1 is a simplified diagrammatic illustration of my invention as applied to an electric welding system, and Fig. 2 is a diagrammatic illustration of my invention as applied to a welding machine having adjustable throat arrangements which involve a variation in the inductance of the secondary or load circuit due to the interchangeability of the deep and shallow throat jaws. Fig. 3 is a modification of the arrangement of Fig. 2 and in which means is provided for controlling the translating system in response to the positions of the welding arms.

Referring now to Fig. 1 of the accompanying drawings, my invention is there illustrated as applied to an electric translating system for energizing a variable impedance circuit, such as a welding circuit 1, from a suitable source of current, such as an alternating current supply circuit 2 which may be a circuit of commercial frequency, such as 60 cycles. A suitable switch 3 may be connected between the supply circuit 2 and the translating apparatus which includes circuit controlling means, such as a pair of reversely connected electric valve means 4 and 5 which, due to the relative connections thereof, serve to transmit alternating current to the associated equipment. The electric valve means 4 and 5 may be of the type comprising an ionizable medium, such as a gas or a vapor, and each includes an anode 6, a cathode such as a mercury pool cathode 7, and an immersion-ignitor control member 8 constructed of a material such as boron carbide or silicon carbide and having an extremity thereof extending into the surface of the mercury. I provide an excitation circuit 9 which transmits impulses of unidirectional current to the control members 8 of electric valve means 4 and 5 of sufficient magnitude to render the electric valve means conducting. The excitation circuit 9 is, of course, arranged to transmit the impulses to the control members 8 of the electric valve means 4 and 5 at times displaced 180 electrical degrees so that the electric valve means are controlled to transmit both half cycles of alternating current. I also provide suitable means for controlling the magnitude of the current transmitted to the load circuit 1. This means may comprise a phase shifter 10 connected between the supply circuit 2 and the excitation circuit 9 and which controls the time at which the energizing impulses of current are transmitted to control members 8 with respect to the voltages applied to the respective anode-cathode circuits of electric valve means 5. These anode voltages, of course, are derived from the supply circuit 2.

The translating apparatus also includes a transformer 11 which transmits power to the welding circuit 1. The transformer 11 may be arranged to include a plurality of primary winding sections 12, 13, and 14, and a secondary winding 15. Primary winding section 12 is provided with a plurality of taps 16 and 17. The primary winding section for the transformer 11 is controlled by apparatus described hereinafter so that the inductive reactance of the transformer is maintained at a value which maintains the translating apparatus in resonance, thereby maintaining the power factor at a relatively high value or at unity.

A suitable power factor correction means, such as a capacitance 18, may be connected in the translating system and is illustrated as being connected in series relation with electric valve means 4 and 5 and transformer 11. The capacitance 18 not only serves to correct the power factor of the load imposed on the supply circuit 2 but also serves to prevent cumulative unidirectional magnetization of the core structure of transformer 11, thereby assuring the transmission of a uniform value of current to the welding circuit 1 and preventing the imposition of undesirable transient load conditions on the supply circuit 2.

In order to control the transformer 11 and particularly the primary winding sections 12–14 to maintain the inductive reactance of the transformer 11, as viewed from the primary side, at a value which maintains the circuit in substantial resonance, I provide switching means 19 for controlling the windings of the transformer 11. The switching means 19 may be arranged to accomplish this function by selectively connecting the primary winding sections 13 and 14 in series or in parallel. In addition, the circuit controlling means may be arranged to engage selectively the taps 16 or 17 of the primary winding section 12, thereby affording an additional arrangement for maintaining the inductive reactance of the transformer 11 and the capacitive reactance of capacitance 18 at equal values.

Referring more particularly to the switching means 19, this switching means may include a structure or contactor including movable contacts 20, 21, and 22 and stationary contacts 23–27, inclusive. The movable contacts 20–22 inclusive and stationary contacts 23–27 inclusive are arranged so that the contactor connects primary winding sections 13 and 14 in series relation when in the position shown in the drawing, and connects these winding sections in parallel relationship when in the upper position.

In Fig. 2 the simplified circuit of Fig. 1 is shown as applied to a welding machine 28. The windings of transformer 11 are shown approximately in a position where the power transformer would be located. The welding machine 28 comprises a frame 29 and a welding head 30 including an upper electrode 31 which is energized from secondary winding 15 of transformer 11 through conductors 32 and 33 and a flexible connection 34. The welding machine 28 is arranged to afford shallow and deep throat adjustments and may be arranged to include two lower arms 35 and 36 which include electrodes 37 and 38, respectively. The lower arms 35 and 36 are supported by a shaft 39 which rotatably supports these connections and which also serves as an electrical conductor for transmitting current between the electrodes 37 and 38 and the secondary winding 15 of transformer 11 through conductor 40. The supporting structure for the upper electrode 31 may be provided with the usual arrangements such as a cylinder 41 including a piston (not shown) which exerts pressure on the work immediately prior to or during the welding operation. The piston of course may be fluid operated.

The contactor or switching means 19 of Fig. 2 has been assigned a reference numeral corresponding to the switching means 19 of Fig. 1. In addition, I provide a suitable means, such as a crank 43, for operating the movable contacts 20–22, inclusive, to control the turn ratio of the power transformer 11. I also provide interlocking means connected between the switching means 19 and a discharge or protective circuit for the capacitance 18. The discharge circuit which is connected across the capacitance 18 may include a resistance 44 and a suitable relay or contactor 45 having an actuating coil 46 which is connected to be energized from a suitable source of current, such as supply circuit 2, through contacts 55 of switch 3. The energization of coil 46 may be controlled through interlocking means comprising auxiliary contacts 55 described hereinafter and by means of interlocking contacts 48 of switching means 19, the latter of which also control the energization of the actuating coil for the switch 3. The contacts 48 may be arranged to be biased to the closed circuit position to effect energization of the actuating coil 46 only when the contacts 20–22 are in predetermined positions. This effect may be obtained by employing a disk 49 which is mounted on a shaft 50 and which includes depressions or notches 51, 52 and 53 which receive a detent and release member 54. By virtue of the association of the detent member 54 with the disk 49, the switching means 19 may not be operated unless the detent member 54 is first raised, thereby opening the circuit for actuating coil 46 and effecting closure of the discharge circuit. Closure of the discharge circuit connects resistance 44 across capacitance 18 and discharges the capacitance, thereby affording a safety feature for the welding machine operator. The necessity for such an interlocking or protective arrangement will be appreciated when it is considered that the voltage across capacitance 18, due to the residual charge left thereon, may attain dangerously high values.

I also provide means for effecting disconnection of the entire translating system in response to the operation of the circuit controlling means 19, or in response to the detent and release member 54. More particularly, the switch or circuit breaker 3 may be provided with a pair of contacts 55 which are connected in series relation with the actuating coil 46 so that the discharge circuit for the capacitance is closed upon movement of the switch 3 to the open circuit position. The switch also includes a pair of sealing-in contacts 56 which are connected across the contacts of a starting switch 57. A stop switch 58 may also be employed and may be connected in series relation with actuating coil 59 of switch 3.

The operation of the embodiment of my invention shown in Figs. 1 and 2 will be explained with particular reference to Fig. 2. It will be apparent that a considerable variation in inductance of the secondary winding of transformer 11 will be involved by using the shallow and deep throat connections of the welding machine 28. That is, when the arm 35 is employed, it will be apparent that the inductance of the secondary circuit is substantially smaller than when the arm 36 is employed. This variation in inductance is, of course, explained by the substantial difference between the two paths through which the welding current must flow. When the welding arm 35 is employed, the current for the secondary winding 15 flows through conductors 32, 33, flexible connection 34, electrode 31, electrode 37, arm 35 and conductor 40. On the other hand, when the arm 36 is employed, the current must flow through a greater distance through the work between the electrodes 31 and 38 and must also flow through the path provided by shaft 39. This variation in inductance is very substantial when it is viewed from the primary side of the transformer. As will be well understood by those skilled in the art, where the transformer turn ratio is large, as it is in this instance, the equivalent or reflected impedance or inductance of the transformer and load, as viewed from the primary side, is substantial since the inductance, and therefore any variation in inductance, appears as a multiple of the square of the turn ratio.

The transformer 11 and the circuit controlling means 19 are designed so that the turn ratio of transformer 11 is adjusted to reflect the same inductance, as viewed from the primary winding, for both shallow and deep throat positions, and at the same time provide for the transmission of adequate welding current to the welding circuit 1. When the arm 35 is employed, it will be apparent that in order to maintain this relationship, the primary winding sections 13 and 14 must be connected in series relation, and when the arm 36 is employed in the welding operation, it is desirable to connect the primary winding sections 13 and 14 in parallel. The transfer from the series to the parallel position, of course, may be effected by raising the detent member 54 and moving the crank 43 in the desired direction. When contacts 21 and 22 engage contacts 26 and 24, respectively, the transformer windings 13 and 14 are connected in series relationship, that is in the position for the shallow throat operation, and when the movable contacts are moved to the other extreme position, the windings 13 and 14 are connected in parallel and the system is arranged for deep throat operation.

An important feature of apparatus built in accordance with my invention is the ready provision of means for maintaining the circuit in resonance irrespective of variations in the inductance of the secondary circuit, thereby maintaining the load derived from the supply circuit 2 at substantially unity power factor. In addition, the impedance of the associated translating equipment is maintained at a value which permits the transmission of appreciable welding current to the welding circuit 1. The transformer 11 may be designed so that the circuit is connected in substantial resonance without seriously interfering with the magnitude of the current which is transmitted to welding circuit 1. However, any variation in the value of the welding current from that value which it would be desired to transmit in order to effect the desired weld may be compensated for by adjustment of the rotary phase shifter 10 by controlling the periods of conductivity of electric valve means 4 and 5.

It will be apparent that from a practical standpoint there are well defined advantages by employing means for effecting control of the inductive reactants of transformer 11, by exclusive control of the transformer, without resorting to means for varying the effective capacitive reactance of the translating equipment.

The system may be placed in operation by closure of switch 57 which operates switch 3 and, hence, effects application of energizing voltage to the translating apparatus. Closure of contacts 55 of switch 3 opens the discharge circuit around the capacitance, and the circuit for effecting energization of the actuating coil of the switch 3 is closed by means of the sealing-in contacts 56 which are connected around the contacts of the starting switch 57.

While in the embodiments of my invention described above the change in the turn ratio of the transformer 11 has been obtained by selectively connecting in series or parallel certain primary winding sections, it will be well understood that I may employ any suitable arrangement for controlling the turn ratio, such as contactor mechanism, for selectively connecting in different sections of a multi-tap transformer winding. Of course, it will be appreciated that contactor or tap control of the primary winding section 12 is described above.

Fig. 3 of the accompanying drawings represents a modification of the control system for the welding machine of Fig. 2 and diagrammatically illustrates an arrangement in which the turn ratio of transformer 11 is controlled in response to the positions of the welding arms 35 and 36. The switching means 19 may be operated electromagnetically, if desired, and may be provided with actuating means, such as a pair of electromagnetic coils 60 and 61 selectively energized in response to the positions of arms 35 and 36. That is, when the welding arm 35 is in position or alinement for performing the welding operation, coil 61 will be energized, operating the switching means 19 to the position which connects windings 13 and 14 in series. Control of the energization of coil 61 in response to the position of arm 35 may be accomplished by the employment of a position responsive device 62 having contacts in series relation with coil 61 and a source of current, such as a battery 63.

In like manner, the coil 60 may be energized in response to the position of the welding arm 36 by means of a position responsive device 64 arranged to have its contacts closed when the arm 36 is in the welding position. The circuit for coil 60 may also be energized from a suitable source such as a battery 65. Of course, it is to be appreciated that instead of employing batteries 63 and 65 the energizing circuits for coils 60 and 61 may be energized from the alternating current supply circuit 2.

In the normal use of the welding machine 28, it will be appreciated that either welding arm 35 or 36 will be employed and that in the normal or intended use of the apparatus these two arms will not be in their respective welding positions simultaneously. Consequently, the movement of either arm 35 or 36 from its welding position will effect interruption of the energizing circuit for its associated coil and consequently permit the other welding arm to effect energization of its associated coil, thereby controlling the switching means 19 to obtain the desired turn ratio for the particular throat adjustment being employed.

While I have shown and described my invention as applied to a particular system of connections and as embodying various devices diagrammatically shown, it will be obvious to those skilled in the art that changes and modifications may be made without departing from my invention and I therefore aim in the appended claims to cover all such changes and modifications as fall within the true spirit and scope of my invention.

What I claim as new and desire to secure by Letters Patent of the United States, is:

1. In combination, an alternating current supply circuit, a variable inductance load circuit, electric translating apparatus connected between said circuits and comprising a capacitance and a winding, the inductance of said winding and said load circuit constituting with said capacitance a circuit tuned substantially to the frequency of the voltage of said supply circuit, and means for controlling said translating apparatus to maintain the power factor substantially constant irrespective of variations in the inductance of said load circuit and comprising means for controlling exclusively said winding.

2. In combination, an alternating current supply circuit, a variable inductance load circuit, electric translating apparatus connected between said circuits and comprising a capacitance and a winding, the inductance of said winding and load circuit constituting with said capacitance a circuit tuned substantially to the frequency of the voltage of said supply circuit, said winding having a plurality of winding sections, and means for controlling the power factor of the current consumed from said supply circuit comprising circuit controlling means for selectively connecting said winding sections in series or in parallel.

3. In combination, an alternating current supply circuit, a variable inductance load circuit, electric translating apparatus connected between said circuits and comprising a capacitance, a transformer having a secondary winding connected to said load circuit and having a plurality of primary winding sections, the equivalent inductance of said transformer and said load circuit constituting with said capacitance a circuit tuned substantially to the frequency of the voltage of said supply circuit, and means for controlling the turn ratio of said transformer to maintain at substantial unity the power factor of the current consumed from said supply circuit irrespective of variations in the inductance of said load circuit.

4. In combination, an alternating current supply circuit, a variable impedance load circuit, electric translating apparatus connected between said circuits and comprising electric valve means, a capacitance and a winding, the inductance of said winding and said load circuit constituting with said capacitance a circuit tuned substantially to the frequency of said supply circuit, means for controlling said translating apparatus to maintain the power factor substantially constant irrespective of variations in the impedance of said load circuit and comprising means for controlling exclusively said winding, and means for controlling said electric valve means to control the magnitude of the current transferred to said load circuit.

5. In combination, an alternating current supply circuit, a variable impedance load circuit, electric tranlating apparatus connected between said circuits and comprising electric valve means having a control member, a capacitance and a winding, the inductance of said winding and said load circuit constituting with said capacitance a circuit tuned substantially to the frequency of said supply circuit, means for controlling said translating apparatus to maintain the power factor substantially constant irrespective of variations in the inductance of said load circuit and comprising means for controlling exclusively said winding, and means for energizing said control member and for controlling the conductivity of said electric valve means to control the magnitude of the current transmitted to said load circuit.

6. In combination, an alternating current supply circuit, a variable impedance load circuit, electric translating apparatus connected between said circuits and comprising a capacitance and a winding, the inductance of said winding and said load circuit constituting with said capacitance a circuit tuned substantially to the frequency of said supply circuit, means for controlling said translating apparatus to maintain the power factor substantially constant irrespective of variations in the inductance of said load circuit and comprising switching means for controlling exclusively said winding, a discharge circuit arranged to be connected across said capacitance, and interlocking means connected between said switching means and said discharge circuit to prevent operation of said switching means unless said discharge circuit is effectively connected across said capacitance.

7. In combination, an alternating current supply circuit, a variable impedance load circuit, electric translating apparatus connected between said circuits and comprising a capacitance and a transformer, the inductance of said transformer and said load circuit constituting with said capacitance a circuit tuned substantially to the frequency of said supply circuit, said transformer having a plurality of winding sections one of which includes a plurality of taps, and means for controlling said translating apparatus to maintain the power factor substantially constant irrespective of variations in the inductance of said load circuit and comprising switching means for connecting predetermined winding sections selectively in parallel or in series relation and for controlling said taps thereby maintaining the resonant circuit tuned.

8. In combination, an alternating current supply circuit, a variable impedance load circuit, electric translating apparatus connected between said circuits and comprising a capacitance and a transformer, the inductance of said transformer and said load circuit constituting with said capacitance a circuit tuned substantially to the frequency of said supply circuit, said transformer comprising a pair of primary winding sections and a third winding section provided with a plurality of taps, and means for controlling said translating apparatus comprising switching means for connecting said pair of primary winding sections selectively in series or in parallel and for controlling the tap connections of said third winding section.

9. In combination, an alternating current supply circuit, a variable impedance load circuit, electric translating apparatus connected between said circuits and comprising a capacitance and a winding the equivalent inductance of said winding and said load circuit with said capacitance constituting a circuit tuned substantially to the frequency of said supply circuit, said winding having a plurality of taps, and means for controlling the power factor of the current derived from said supply circuit comprising circuit controlling means for selectively engaging said taps.

10. In combination, an alternating current supply circuit, a welding machine having an upper welding arm provided with a welding electrode and a plurality of spaced lower welding arms each provided with a welding electrode, a transformer having a plurality of primary winding sections and a secondary winding connected to said electrodes, switching means for controlling said winding sections, and means responsive to the positions of said lower welding arms for operating said switching means to energize said primary winding sections selectively in series or parallel.

11. In combination, an alternating current supply circuit, a welding machine having an upper welding arm provided with a welding electrode and a plurality of spaced lower welding arms each provided with a welding electrode, a transformer having a plurality of primary winding sections and a secondary winding connected to said electrodes, the use of different lower welding arms causing a variation in the reflected impedance as viewed from said primary winding, switching means for controlling said winding sections, and means responsive to the positions of said lower arms for operating said switching means to control the turn ratio of said transformer.

12. In combination, an alternating current supply circuit, a welding machine having an upper welding arm provided with a welding electrode and a plurality of lower welding arms each provided with a welding electrode, a transformer having a plurality of primary winding sections and a secondary winding connected to said electrodes, switching means for connecting said primary winding sections to said supply circuit, a capacitance arranged to be connected in series relation with said primary winding sections for controlling the power factor of the load imposed on said supply circuit, and means responsive to the positions of said lower arms for operating said switching means to maintain substantially constant the reflected impedance of said transformer and the secondary winding circuit as viewed from the primary side irrespective of variations in the impedance of said secondary winding circuit occasioned by the use of different lower welding arms.

13. In combination, an alternating current supply circuit, a welding machine having an upper welding arm provided with a welding electrode and a plurality of lower welding arms each provided with a welding electrode, electric translating apparatus connected between said supply circuit and said welding machine and comprising a capacitance and a transformer having a plurality of primary winding sections and a secondary winding connected to said electrodes, means for controlling said translating apparatus to control the power factor of the load imposed on said supply circuit and for compensating for variations in the inductance of the secondary winding circuit occasioned by the use of different welding arms and comprising switching means for connecting selectively said primary winding sections in different arrangements, and means responsive to the positions of the welding arms for controlling said switching means.

14. In combination, an alternating current supply circuit, a welding machine having an upper welding arm provided with a welding electrode and a plurality of lower welding arms each provided with a welding electrode, electric translating apparatus connected between said supply circuit and said welding machine and comprising a capacitance and a transformer having a plurality of primary winding sections and a secondary winding connected to said electrodes, and means for controlling said translating apparatus to control the power factor of the load imposed on said supply circuit and for compensating for variations in the inductance of the secondary winding circuit occasioned by the use of different welding arms and comprising switching means for connecting selectively said primary winding sections in different arrangements.

15. In combination, an alternating current supply circuit, a welding machine having an upper welding arm provided with a welding electrode and a pair of lower welding arms rotatably mounted on a vertical shaft, each of said welding arms being provided with a welding electrode, a transformer having a plurality of primary winding sections and a secondary winding having one terminal connected to the electrode of said upper welding arm and a second terminal connected to the electrodes of said lower welding arms through said shaft, the use of different lower welding arms causing variations in the reflected impedance of said transformer as viewed from the primary winding sections, switching means for controlling said winding sections for maintaining the reflected impedance of said secondary winding as viewed from the primary winding sections substantially constant, actuating means for said switching means, and means positioned to be engaged by said lower welding arms for controlling the energization of said actuating means.

16. In combination, an alternating current supply circuit, a welding machine having an upper welding arm provided with a welding electrode and a pair of lower welding arms rotatably mounted on a vertical shaft, each of said welding arms being provided with a welding electrode, a transformer having a plurality of primary winding sections and a secondary winding having one terminal connected to the electrode of said upper welding arm and a second terminal connected to the electrodes of said lower welding arms through said shaft, switching means for controlling said winding sections, actuating means for said switching means, and a pair of individual means one of which is associated with one of said lower welding arms and the other of which is associated with the other lower welding arm for controlling the energization of said actuating means.

17. In combination, an alternating current supply circuit, a welding machine having an upper welding arm provided with a welding electrode and a pair of lower welding arms rotatably mounted on a vertical shaft, each of said welding arms being provided with a welding electrode, a transformer having a plurality of primary winding sections and a secondary winding having one terminal connected to the electrode of said upper welding arm and a second terminal connected to the electrodes of said lower welding arms through said shaft, switching means for controlling said winding sections, actuating means for said switching means, means responsive to the position of one of said welding arms for controlling said aftuating means and for connetcing said primary winding sections in series relation, and means responsive to the position of the other lower welding arm for energizing said actuating means and for connecting said primary winding sections in parallel relation.

18. In combination, an alternating current supply circuit, a welding machine having an upper welding arm provided with a welding electrode and a pair of relatively movable lower welding arms each arranged to be placed in welding position with respect to said upper welding arm and each including a welding electrode, a transformer having a primary winding and a secondary winding having one terminal thereof connected to the electrode of said upper welding arm and a second terminal connected to the electrodes of said lower welding arms, the use of different lower welding arms causing variations in the reflected impedance of said transformer as viewed from the primary winding, switching means for controlling said primary winding for maintaining the reflected impedance of said primary winding substantially constant, and means positioned to be engaged by the lower welding arms for controlling said switching means.

19. In combination, an alternating current supply circuit, a welding machine having an upper welding arm provided with a welding electrode and a pair of relatively movable lower welding arms mounted upon a common supporting means and each including a welding electrode, power transmitting means for transmitting current from said supply circuit to said upper welding arm and to said lower welding arms through said supporting means, means for controlling said power transmitting means, and means positioned to be engaged by said lower welding arms for controlling the last mentioned means.

LOUIS G. LEVOY, Jr.